Nov. 25, 1958     V. HAVLÍČEK ET AL     2,862,181
APPLIANCE FOR THE MEASUREMENT OF THE ELECTRIC RESISTANCE
OF INSULATING FILAMENTS MORE PARTICULARLY FOR
MEASURING THE ELECTRIC SPECIFIC SURFACE
RESISTANCE OF GLASS FILAMENTS
Filed Sept. 6, 1956
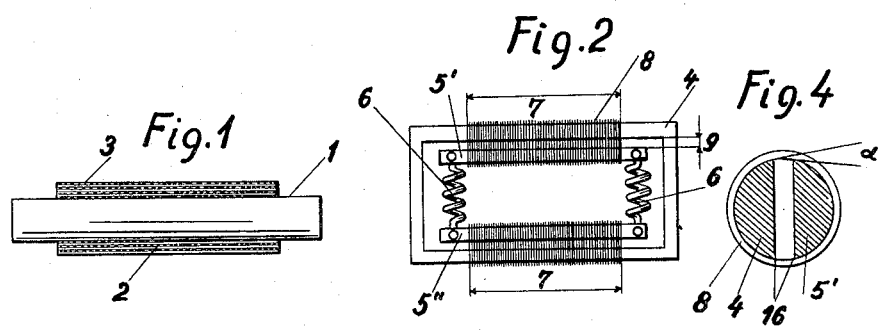
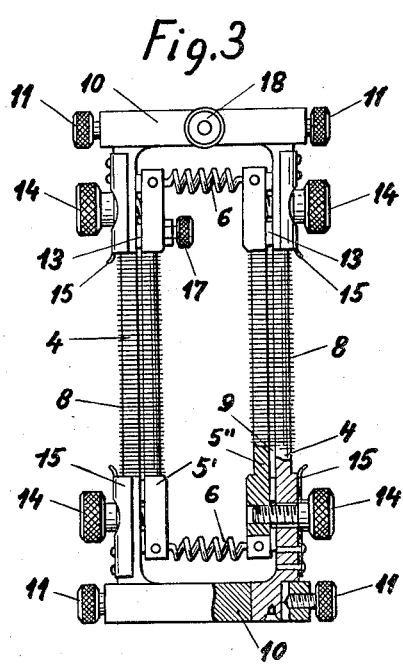
INVENTORS
Vítězslav Havlíček, Jan Starch
BY United States Patent Office 2,862,181
Patented Nov. 25, 1958

2,862,181

APPLIANCE FOR THE MEASUREMENT OF THE ELECTRIC RESISTANCE OF INSULATING FILAMENTS MORE PARTICULARLY FOR MEASURING THE ELECTRIC SPECIFIC SURFACE RESISTANCE OF GLASS FILAMENTS

Vitězslav Havlíček and Jan Starch, Prague, Czechoslovakia, assignors to Krizik-Karlin, vyvojovy zavod, narodni podnik, Prague-Karlin, Czechoslovakia Application September 6, 1956, Serial No. 608,284

5 Claims. (Cl. 324—65)

As is well known, the results of the measurement of the electric specific resistance constitute a criterium for the qualification of the electro-insulating filaments used for braiding the dynamo conductors. By the measurement of the specific surface resistance it is possible to compare the properties of the filaments of different kinds, the determination of the alterations of such resistance under certain conditions constituting a means serving, for example, for the choice of an appropriate chemical composition of the glass, from which the filaments are made or for the choice of a suitable chemical composition of the impregnating varnish materials for such filaments. The appliance designed in accordance with the present invention as will be disclosed hereafter is such that it can be used for a long-term measurement of the electric specific surface resistance both at higher temperatures such as, for example, 100, 200, 300 degrees centigrade and at tropical dampness, that is, under the extreme operational conditions of electric machines and contrivances, as well as for research and development work on new or improved insulation filaments and electroinsulating varnish materials, such as, for example, silicon varnishes.

The above, and other objects, features and advantages of the invention, will be apparent in the following detailed description of illustrative embodiments thereof which is to be read in connection with the accompanying drawing, wherein:

Fig. 1 shows a known device for measuring the electrical insulating properties of filaments of insulating material;

Fig. 2 is a schematic view of a device embodying this invention;

Fig. 3 is an elevational view, partly broken away and in section, of a preferred embodiment of this invention; and Fig. 4 is an enlarged, transverse sectional view of a part of the device in Fig. 3.

In order to illustrate more clearly the advantages and features of the apparatus according to the present invention, the well known procedure for measuring the electrical insulating properties of filaments of insulating material will now be briefly described with reference to Fig. 1. On an aluminum tube 1, five layers, for example, of the filament 2 to be tested, are wrapped in a length of about 10 centimetres. On the outer extreme layer an aluminum foil 3 is wrapped, thus forming an electrode, the other electrode being formed by the tube 1, and the surface resistance of the layers is measured between both electrodes. For the determination of the specific resistance it is necessary to know the length of the path and the surface area through which the electric current is passing. With the use of the aforesaid appliance these values are not satisfactorily definable. If abstraction is made from the determination of the specific resistance and merely the insulation resistance of the given sample is to be measured, this procedure does not offer adequately reproduceable results and comparative measurements show even differences of magnitude order. If, moreover, the aforesaid appliance is used for carrying out measurements in a damp medium, then no direct access is provided for the damp air to the filament layers so that a longer period is required for diffusion of the air into the space of the layers between the electrodes. These diffusion periods can substantially vary in accordance with the differing characteristics of the layers (different diameters and different materials) and with the technological process of manufacture and influence substantially the short-term comparative measurements of the resistance alterations in dependence on time.

A further source of measuring errors may be produced by reaction of the aluminium of the electrodes with the damp medium and with the products of hydration which may have been formed by the glass filaments whereby the total electrolytic conductivity is altered.

The new and improved apparatus according to the present invention, as illustrated in Figure 2, consists substantially of two metal electrodes in the shape of frames, the outer frame 4 being in the form of a fixed rectangle and the inner frame being formed by two electrodes 5', 5" of a total length of about 10 centimetres. The electrodes 5', 5" of the inner frame are drawn together by two springs 6. Both frames 4 and 5', 5" are at a certain length 7 wrapped by a single layer of filament 8 or yarn laid in a helical line of constant pitch without overlapping of the threads. The surface resistance of the filaments 8 or yarn is measured across parallel paths 9 given by the air gap between the electrodes 4 and 5' respectively 5". Owing to the fact that the inner frame electrodes 5', 5" are held to the outer frame 4, by the filament 8 and are pulled by the springs 6, the inner frame 5', 5" is self-supporting without the aid of any fixed stationary insulating support. This fact is the first outstanding feature of the new arrangement according to the present invention, as the electric leakage between the electrodes 4 and 5', 5" over the stationary insulating support would distort the measuring results in an indeterminable manner. Thus, it would be impossible to obtain correct results of measurements, more particularly in a damp and hot medium.

A further feature of the appliance designed in accordance with the present invention consists in the fact that it provides a direct instantaneous access of the damp medium to the filaments. The importance of such direct access has already been explained.

Finally, a third feature of the appliance designed in accordance with the present invention consists in the fact that the surface of the filament (yarn) 8 is adequately measurable, definable and reproduceable, so that under the given circumstances the measurement can be considered as being precise. This fact is of outstanding importance, as otherwise such measurement would not permit an appropriate comparative evaluation of filaments of different composition, finish and impregnation.

The aforesaid features of the apparatus according to the present invention will now be more clearly illustrated in a description of a practical embodiment given by way of example. Figure 3 of the accompanying drawing, to which the following description refers, represents a readily diseassembled frame consisting of two outer electrodes 4 and of two inner electrodes 5', 5". The outer electrodes 4 have cylindrical ends which are inserted into the transverse connecting metal members 10 and firmly secured by means of four screws 11. The aforementioned cylindrical ends are each provided with a groove for engagement with a wedge placed in the aperture of the aforesaid transverse connecting member 10, thus preventing turning of the electrode 4 in the opening of said transverse member 10. Before winding on the filament 8, the electrodes 4 and 5′, 5″ are taken out of the transverse connecting members 10 and therebetween—into the air gap—four calibrated distance spacers 13 of U shape are inserted for ensuring reliably the maintenance of the chosen precise length of the path 9 of the electric current (for example 1 mm.) on the surface of the filaments 8. The pairs of electrodes 4 and 5′, 5″ and the spacers 13 are secured together by the screws 14. The group of electrodes 4—5′, 5″ consisting of two pairs of electrodes 4, 5′ and 4, 5″ thus secured together in a preliminary manner is introduced, for example, into the points of a lathe and, from a yarn bobbin, yarn is wound up on both electrodes over braking pulleys. For this purpose, the electrode 4 is provided at its ends with conical correctly centered grooves to receive the lathe points, and with flat springs 15 fixed at the ends of the electrode and serving for holding the ends of the filaments 8. The electric voltage is fed to the electrode through the terminals 17 and 18.

The sectional area of each of paired electrodes 4, 5′ and 4, 5″ is approximately in the shape of a circular segment (Figure 4). However, at the points 16, the circular arcs are progressively chamfered in order to prevent the tangents at these points, where the filaments leave the electrodes, i. e. at the end points of the arcs which are parallel to the direction of the filaments, so that a slight angle of about 5 to 10° is formed there, so as to make the angle between the chord and the respective tangents smaller than 90°, as in such a case the points 16 from which the current is led away merely by the filament, are geometrically sharply defined. If the angle $\alpha$ is equal to zero, then the springs 6 (Figures 2 and 3) tightening the inner frame 5′, 5″ would exert no pressure between the filaments 8 and electrodes 5′, 5″ precisely at the points 16. These points 16 of electrical contact would then be undefined. After winding on the layer of filament 8 or yarn, both pairs of electrodes 4, 5′ and 4, 5″ are inserted into the transverse connecting members 10, whereupon the springs 6 are mounted, the screws 14 screwed out and the gauges 13 removed. The gauges 13 and screws 14 are of an insulating material so as to prevent a short occurring in the switched in galvanometer in case the attendant neglects to remove the same on starting the measuring operations. The apparatus is now prepared for measurement.

In order to prevent the occurrence of chemical reactions, the appliance is made of hard copper with platinum plating. However, in certain cases it is necessary to wind on the filaments on purely copper electrodes so as to bring about an actual copper reaction as in the case of actual use, when the filament is wound round a copper dynamo conductor and exposed to the effects of heat, dampness and air or the filament is wound on another material from which the dynamo conductor is manufactured.

We claim:

1. Apparatus for use in measuring the electrical resistance of filaments of insulating material, comprising a rigid outer, frame-like electrode having two opposed side portions, an inner frame-like electrode arranged within said outer frame-like electrode and including two opposed side portions which extend parallel to said side portions of the outer electrode and are spaced from the latter so that the adjacent side portions of the inner and outer electrodes can be wrapped with the filaments to be measured, said inner electrode further including tension springs connected between the ends of said side portions of the inner electrode for pulling together the related side portions, thereby to maintain the spaced apart relationship of said adjacent side portions, and terminals for connection to a source of electric current mounted on said outer and inner electrodes, respectively.

2. Apparatus as in claim 1; further comprising removable spacing members of insulating material adapted for positioning between said adjacent side portions of the outer and inner electrodes during wrapping of the filaments thereon, and removable screws of insulating material engageable with said adjacent side portions for holding the latter in assembled relationship with said spacing members therebetween during the wrapping of filaments on the adjacent side portions.

3. Apparatus as in claim 1; wherein each of said side portions has the shape of a circular segment in cross-section with tangents to the arc of said circular segment at the opposite ends of said arc and the chord of said circular segment enclosing angles of less than 90 degrees.

4. Apparatus as in claim 1; wherein all of the metallic parts of the apparatus are platinum plated.

5. An apparatus as in claim 1; wherein said side portions of the inner and outer electrodes are of the same material as that which forms the conducting core of a conductor to which the filaments being measured will be applied.

References Cited in the file of this patent

UNITED STATES PATENTS

| | | |
|---|---|---|
| 2,252,222 | Vanos | Aug. 12, 1941 |
| 2,548,410 | Tyson | Apr. 10, 1951 |
| 2,702,948 | Seney | Mar. 1, 1955 |